United States Patent [19]

Young et al.

[11] Patent Number: 5,332,975
[45] Date of Patent: Jul. 26, 1994

[54] SINE WAVE GENERATOR UTILIZING VARIABLE ENCODING FOR DIFFERENT FREQUENCY SIGNALS

[75] Inventors: James R. Young; William J. Gleeson, III, both of Tucson, Ariz.

[73] Assignee: NetMedia Inc., Tucson, Ariz.

[21] Appl. No.: 983,878

[22] Filed: Dec. 1, 1992

[51] Int. Cl.⁵ .......................... H03K 5/08; H03B 19/00
[52] U.S. Cl. ...................................... 328/14; 307/271; 307/262
[58] Field of Search ................. 328/14; 307/259, 260, 307/262, 271; 375/45; 377/54, 64

[56] References Cited

U.S. PATENT DOCUMENTS

| | | | |
|---|---|---|---|
| 3,579,117 | 5/1971 | Norris | 328/14 |
| 3,792,360 | 2/1974 | Carlow | 328/14 |
| 3,838,414 | 9/1974 | Wiles | 328/14 |
| 4,056,692 | 11/1977 | Place | 328/14 |
| 4,349,887 | 9/1982 | Crowley | 328/14 |
| 4,446,436 | 5/1984 | Ireland | 328/14 |
| 4,599,583 | 7/1986 | Shimozono et al. | 328/14 |
| 4,710,890 | 12/1987 | Bailey | 328/14 |
| 4,752,902 | 6/1988 | Goldberg | 328/14 |
| 4,931,986 | 6/1990 | Daniel et al. | 377/54 |
| 5,014,285 | 5/1991 | Basile et al. | 328/14 |
| 5,179,348 | 1/1993 | Thompson | 328/14 |

OTHER PUBLICATIONS

E.D.N. vol. 23 No. 2 Jan. 20, 1978 Simple Circuit Generates Fine Wave Digitally.

Primary Examiner—Timothy P. Callahan
Assistant Examiner—Tuan T. Lam
Attorney, Agent, or Firm—Joseph H. Roediger

[57] ABSTRACT

A system for converting digital data to sine waves of differing frequency for networking computers. The sine waves are synthesized using variable encoding. The data is shifted through registers at a multiple of the data rate with the state of the stages of the register monitored to locate the zero-crossing of the sine wave. The state of the register stages is supplied to a series of multiplexers and resistors to generate the segments used to synthesize the sine waves. The data is monitored to derive a signal supplied to the multiplexers to determine the encoding pattern for each bit cell of data.

11 Claims, 5 Drawing Sheets

SINE WAVE GENERATOR UTILIZING VARIABLE ENCODING FOR DIFFERENT FREQUENCY SIGNALS

BACKGROUND OF THE INVENTION

This invention relates to a sine wave generator using digital circuitry to provide variable encoding in the simulation of sine waves of differing frequency.

The generation of simulated sine waves from digital data is a well-known technique for converting digital information to analog form. The circuit arrangements are relatively complex designs and typically include a network of resistors and switches to achieve a piecewise approximation of a sine wave. The frequency of the generated signal and the number of segments used in the encoding of each cycle of the signal determine the rate at which the encoding switching takes place. The achieving of reliable switching operation at frequencies in the range of 100 MHz is difficult and often imposes a limitation on the encoding scheme used to generate the sine wave.

The generation of simulated sine waves of different frequencies in accordance with received digital data is important in the networking of computer equipment. The ability of multiple computers to be interconnected in a network enables the computers to communicate with shared equipment such as file servers as well as other computer stations. One method of successfully linking individual computers to a network converts the data into analog signals for transmission through cable extending therebetween.

The data in digital form is converted to analog form by encoding a sine waveform and varying the frequency in accordance with the transmitted data. A number of different encoding patterns have been utilized. However, the use of a single encoding system to simulate wave forms of different frequencies from digital data signals can introduce problems in the decoding of the signals. While the encoding of a high frequency signal can be accomplished with a reduced number of segments when compared with a low frequency signal having a longer period without making the signal unrecognizable, the use of the same number of segments to simulate the low frequency signals may end up producing an unacceptable waveform. Furthermore, the short period of the high frequency signal can only accommodate a limited number of switching operations in that interval and that limited number may not be sufficient to create a useful approximation to the longer period, low frequency signal. The effects of the less than satisfactory representation of the lower frequency signal are compounded by distortion and losses resulting from the switches, the transmission line and the subsequent circuitry. The problem is exacerbated by the high rates of data transmission used in networks. As a result, the potential for loss of transmitted data increases when a single encoding pattern is used for the different frequency analog signals.

Accordingly, the present invention is directed to the provision of a sine wave generator using digital circuitry to generate analog signals of differing frequency in response to a data stream. In addition, the subject invention is intended for use with high rate data streams without requiring the operation of switching devices at multiples of the data rate. Further, the system employs variable encoding for the generation of wave forms at different frequencies thereby providing a readily recognizable representation of the desired sine wave form.

SUMMARY OF THE INVENTION

This invention relates to a system for generating sine wave signals of different frequency in response to a digital data stream. The system utilizes different encoding patterns to synthesize waveforms of different frequency.

The system includes a data stream receiver which receives the data and a system clock signal operating at the data rate. The receiver provides a digital data signal at the midpoint of each bit cell of received data. The midpoint is established by the clock signal. A change in the level of the digital data signal occurs at the midpoint only upon a change in the received data. Thus, the digital data signals remain at a 1 or 0 level until there is a change in the received data of a subsequent bit cell. The digital data signal is supplied from the receiver to the first stage of shift register. Each of the stages of the shift register is provided with an output terminal. A shift rate signal is supplied to the shift register means to advance the digital data signal therein at a rate substantially greater than the rate of the received data stream. Thus, the state of the output signal at the terminal of each stage of the shift register means has the capability of changing at the frequency of the shift rate signal. The digital information in the form of the digital data signal progresses through the register means to succeeding stages in accordance with the shift rate signal. As a result, the system is operating at the shift rate which is a multiple of the data rate. The present system monitors the state of the output terminals of the shift register to identify a unique coding pattern that establishes the zero or reference level crossing of the synthesized signal. Recognition takes place one bit cell interval later than the corresponding data.

The present system also includes an encoding means for synthesizing the sine wave from the stored data. The encoding means has a plurality of input terminals with each of the input terminals being coupled to at least one output terminal of the shift register. The encoding means includes a series of multiplexers which receive input signals from the stages of the shift register and provide signals to a resistor network. The signals from the resistor network are supplied to a common or summing terminal. The waveform of the signal appearing at the summing terminal is a synthesized sine wave constructed from segments as determined by the encoding pattern developed by the multiplexers and supplied through the network. The multiplexers are logically controlled by the output signals from an output control generator.

A frequency control signal is derived from the digital data signal of the data stream receiver. This control signal indicates when the frequency of the synthesized sine wave is to be changed and a different encoding pattern utilized to synthesize the waveform at the summing terminal. The frequency control signal is supplied to the encoding means to control the multiplexers. The multiplexers supply the appropriate signals based on the signals at selected shift register output terminals to the resistor network. The multiplexers are used to determine the number of segments summed at the time of each shift rate signal in order to synthesize the waveform assembled at the summing terminal.

In the preferred embodiment, the low frequency waveform is encoded using more segments than are used to generate the higher frequency wave form. As a result, the high and low frequency waveforms are encoded differently to more closely approximate the sine wave form without requiring switching operations during the relatively short period of the shift rate signal. The shift rate signal provided to the shift register is also provided to the output control circuit which generates the frequency control signal. The shift rate signal is many times the data rate, for example sixteen times. As a result, data is being shifted through the stages of the shift register and the multiplexers are being controlled at a multiple of the data rate. The frequency control signal changes at the data rate as required by the data.

The output control circuit receives the digital data signal and the system clock signal. In addition, the circuit is coupled to selected output terminals of the shift register means to receive information which establishes the zero crossing of the synthesized sine wave. The state of the stages of the registers containing information proximate to the midpoint of the bit cell are monitored to determine if a frequency control signal is required to shift the frequency of the synthesized sine wave. Thus, the frequency control signal is generated in response to a recognition of the particular pattern of signals from selected shift register terminals. The output state at the selected stages of the shift register indicate the time for the zero crossing of the synthesized sine wave signal. This information is used in combination with the shift rate signal to provide the frequency control signal for the encoding means. All of the multiplexers are responsive to the presence or absence, i.e. state, of the frequency control signal. The contribution that each multiplexer makes to the signal at the summing terminals is determined by the state of the shift register stages that it is coupled to. Thus, the encoding pattern utilized to synthesize a waveform is determined by the shift register and the frequency control signal. The timing of the zero crossing is controlled by the control signal generator and the frequency control signal produced thereby.

The system initially converts the data to the form of a digital data signal shifted in time by one-half of a bit cell. The digital data signal is shifted through the register means to generate the segments of the encoding pattern at a multiple of the data stream rate. The frequency control signal directs the multiplexer operation. The system utilizes digital circuitry and avoids the use of high frequency switching or filtering techniques in creating the desired waveforms. The frequency of the waveform generated at the summing terminal contains the information being transmitted through the computer network.

Further features and advantages of the invention will become more readily apparent from the following detailed description of a preferred embodiment when taken in conjunction with the accompanying drawings.

DESCRIPTION OF THE PREFERRED EMBODIMENT

Figure 1:
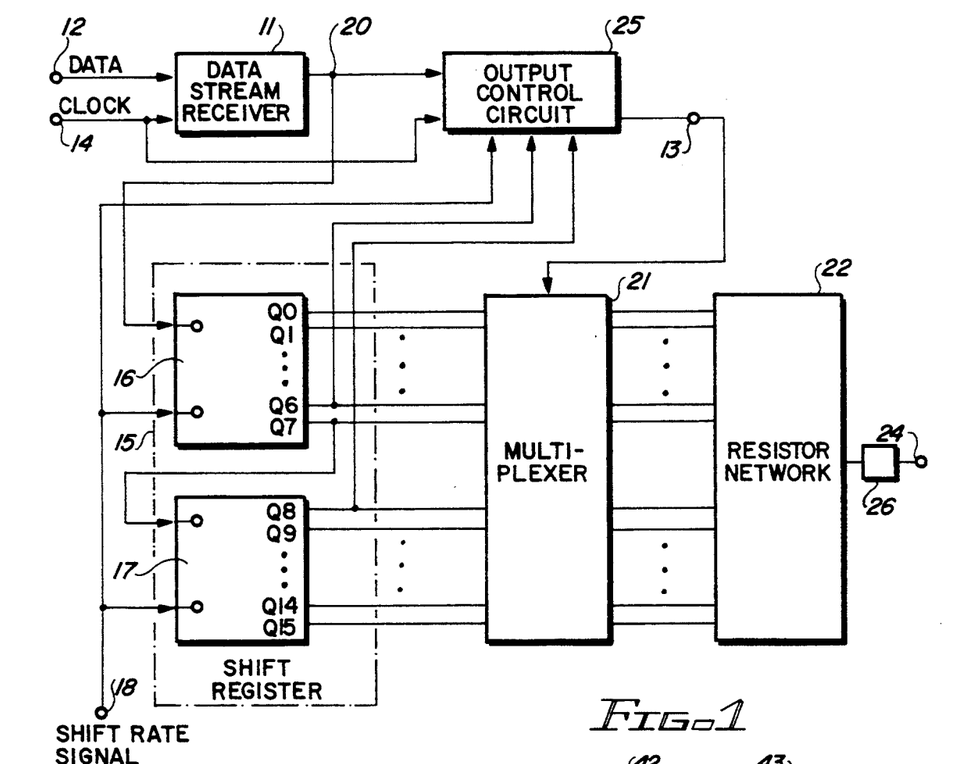
FIG. 1 is a block schematic diagram of a preferred embodiment of the invention.

Referring now to FIG. 1, the preferred embodiment is shown including a data stream receiver 11 having a data stream signal and a clock signal applied at input terminals 12 and 14 respectively. The data stream is comprised of one of two voltage levels during a 100 nanosecond time interval. This interval is termed a bit cell and, in this embodiment, a high voltage level denotes a one and a low voltage level denotes a zero. If the data, either a one or a zero, does not change between successive bit cells no transition occurs and the voltage level remains the same in the following interval. The system clock signal is a 10 MHz square wave, externally generated by a conventional oscillator circuit. The negative-going transitions of the clock signal are time aligned with the transition between bit cells of the data. Thus, one square wave cycle of the clock signal occurs for each bit cell with the positive-going transition of the clock signal occurring in the middle of each bit cell.

The data stream receiver 11 includes a circuit to generate a digital data signal, appearing at terminal 20, which is characterized by the fact that the direction of the transition between voltage levels occurring at the midpoint of the bit cell signifies whether the data bit in this bit cell is a one or a zero. In the embodiment shown, the transition from high to low voltage level at the midpoint of the bit cell denotes a zero. The data stream receiver of FIG. 2 includes a circuit referred to as a D-flop 40 which provides an output signal based on the state of the data signal at the time of the rising edge of the clock signal supplied to terminal 14. The D-flop is a memory device in that the output will remain (i.e. latches) at this level until the conditions of the data signal changes whereupon the output signal of the D-flop can change at the next rising edge. The digital data output signal from D-flop 40 is supplied to an output control circuit 25 along with the data system clock signal and to shift registers 15.

Returning to FIG. 1, the digital data signal from the data stream receiver 11 is supplied to the shift registers 15 which comprises two serially-connected eight stage shift registers 16 and 17. The output signal from the data stream receiver 11 is applied to the input terminal of first shift register 16. The shift register 16 has eight output terminals, $Q_0$ through $Q_7$, with the last $Q_7$ being coupled to the input terminals of the second shift register 17. The digital data signal determines the state of the output terminal $Q_0$ with changes in its output state occurring when the digital data signal changes states. A shift rate signal at the rate of 160 MHz is provided at terminal 18 and is supplied to the shift registers to advance the digital data signal at the first stage through the subsequent stages of the serially-connected shift registers.

Figure 3:
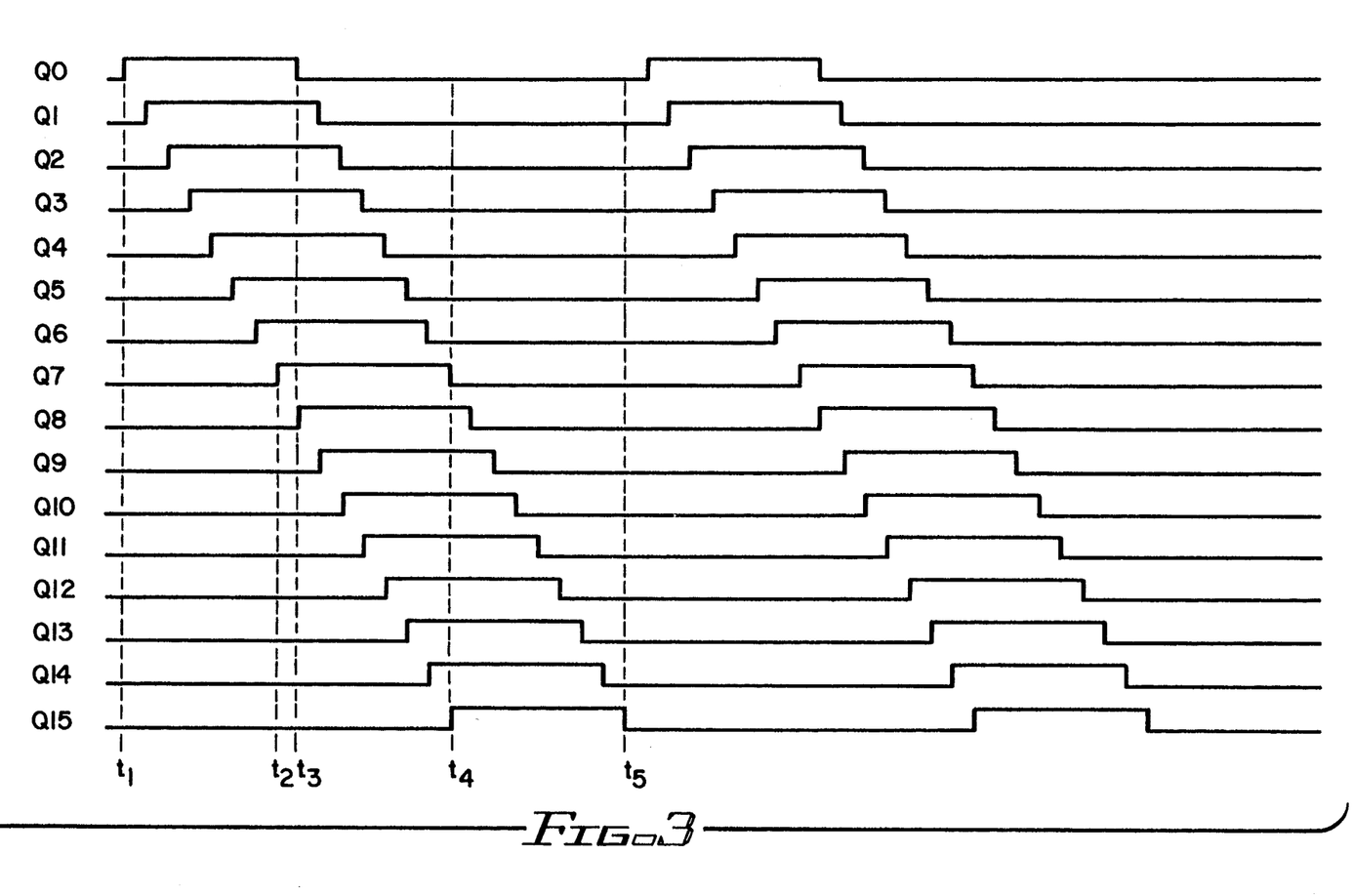
FIG. 3 is a timing diagram of the signals appearing at the output terminals of the shift register of FIG. 1.

The timing diagram of the signals appearing sequentially at the output terminals of the shift register means 15 is shown in FIG. 3. For example, the transition in the waveform at terminal $Q_0$ at time $t_1$, is to the high level signifying a change in data in that particular bit cell. The high level is maintained in the first stage of the first register while the next shift rate signal at 160 MHz takes the second stage to that level. This shift is shown by the following transition at the output terminal $Q_1$. In this manner the data advances through the sixteen stages of the shift register as shown in FIG. 3. At time $t_2$, the data advances from the last stage of the first register to the first stage of the second register. The bit cell interval of the register input signal is equal to the $t_3$ to $t_1$ interval, now displaced by one-half of the bit cell of the data as received by the system. The next transition occurs at time $t_3$ which takes output terminal $Q_0$ low. The low state then progresses through the register reaching the last stage at time $t_5$. The output at terminal $Q_{15}$ remains high during the $t_4$ to $t_5$ interval whereupon it goes low. The next succeeding 160 MHz shift rate signal is shown in FIG. 3 as taking the first stage of the first register high once again. It is to be noted in FIG. 4, that the pulse widths of the register output signals are not uniform since the transitions in the signal provided to the shift register convey the information and without a transition the output states of the shift register output terminals $Q_0$ to $Q_{15}$ serially reflect a no change condition. While the preferred embodiment utilizes shift register means to derive the sequential output signals for the subsequent encoding process, it is to be noted that similar types of devices such as a tapped delay line can be utilized if desired.

The output terminals $Q_0$ to $Q_{15}$ of the shift registers are coupled to the encoding means shown in FIG. 1 as including a multiplexer 21 and a resistor network 22. The multiplexer 21 is coupled to selected output terminals of the shift registers and also receives a frequency control signal from the output control circuit 25. The encoding means generates a series of signals, utilizing the shift rate signal for timing, which vary in magnitude to synthesize a sine wave when combined at the common terminals 24. The frequency of the waveform so generated and the encoding pattern are controlled by the signal from output control circuit 25. In the embodiment shown, the sine wave synthesized shifts between 5 to 10 MHz with the encoding patterns using eight and twelve segments respectively. It should be noted that other coding patterns employing a different number of segments may be utilized if desired by changing the connections between multiplexers and the shift registers.

Figure 4:
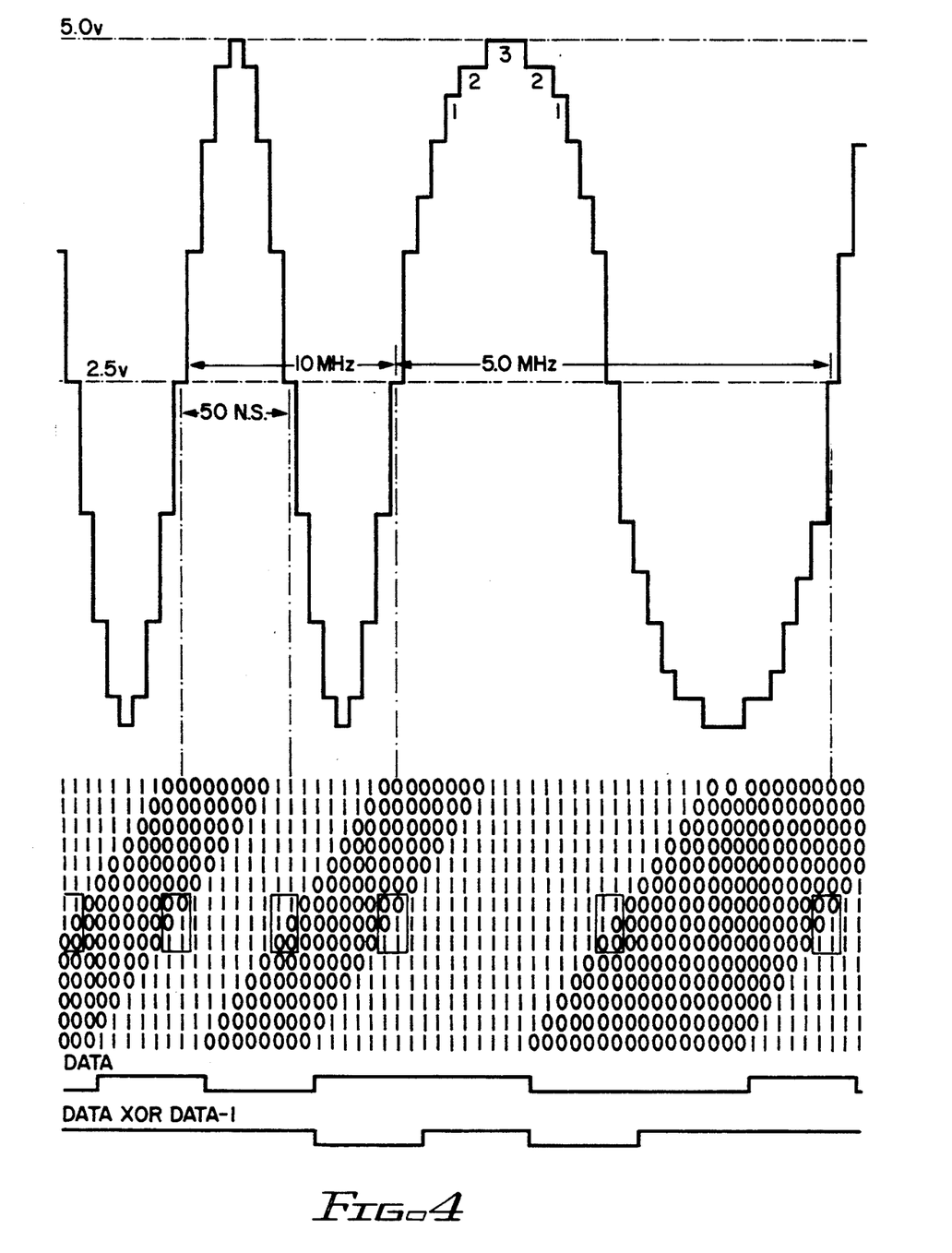
FIG. 4 is a timing diagram showing the synthesized waveform at the summing terminal of the embodiment of FIG. 1.

The output signals at the terminal 24 are shown in FIG. 4 for the 10 MHz and the 5.0 MHz waveforms. The generated output signals are synthesized using different encoding patterns. The positive half cycle of the 10 MHz signal occurs during a 50 nanosecond interval and is encoded using four voltage segments during the interval. The negative half cycle is similar. The 5.0 MHz signal occupies a 100 nanosecond interval in its half cycle and the use of the same number of segments for encoding would significantly depart from the sine wave form. The present invention utilizes a different encoding pattern for the 5.0 MHz signal thereby enabling the system to more accurately create the sine wave form at the lower frequency. The advantage of using additional segments to encode the waveform of the 5.0 MHz signal so as to more closely approximate a sine wave is seen from FIG. 4.

A change in frequency of the output signal at terminal 24 is determined by the frequency control signal appearing at terminal 13 of output control circuit 25. The encoding pattern is determined by the state of selected output terminals of the shift register means and the resistor network. In FIG. 1, the $Q_6$ terminal of register 16 and the $Q_8$ terminal of register 17 are coupled to the output control circuit 25. This circuit generates the frequency control signal for the multiplexer 21 from the received data and from the states of selected shift register output terminals. The nominal zero crossing of the synthesized waveform is the level at which the wave form is in transition between positive and negative extremes. As noted in FIG. 4, the zero-crossing level corresponds to two unique coding patterns at the shift register output terminals. Beneath the generated waveforms in FIG. 4 are shown the states of all but the first and last, $Q_0$ and $Q_{15}$, of the shift register output terminals. The sequences of states for the positive-going and negative-going zero-crossings are shown outlined by the rectangles. Counting up from $Q_1$ of the first shift register, both outlined sequences of the output states of the $Q_6$ and $Q_8$ register output terminals are unique at the zero-crossings. The system uses the pattern of the $Q_6$ and $Q_8$ states to establish the occurrence of the zero-crossing. By using this information along with the digital data signal, the frequency of the waveform is established for the succeeding bit cell by the output control circuit 25.

Figure 2:
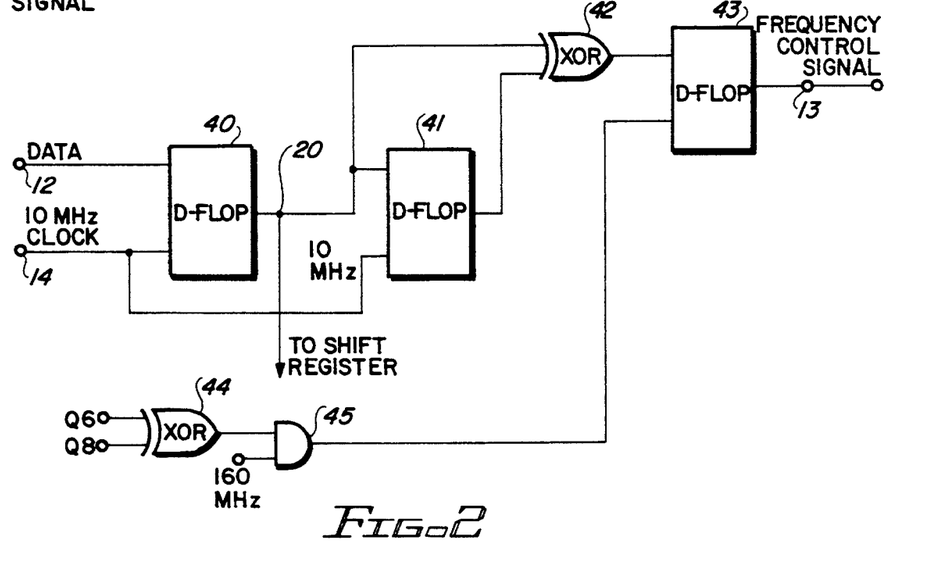
FIG. 2 is a block schematic diagram of the data stream receiver and output control circuit of the embodiment of FIG. 1.
Figure 6:
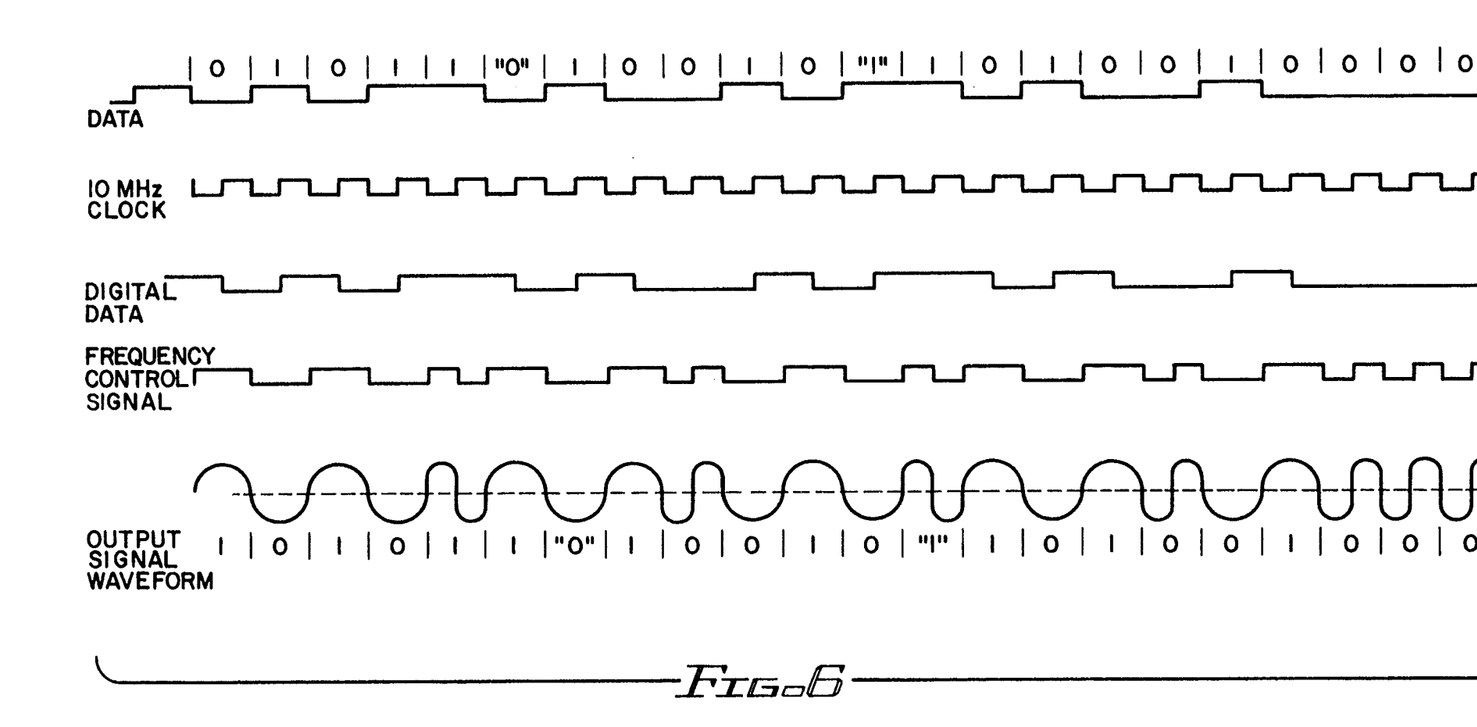
FIG. 6 is a timing diagram showing the relationship between the sine wave output signal, the system clock signal and the data signals for the embodiment of FIG. 1.

The output control circuit 25 used in the present embodiment is shown in the block schematic diagram of FIG. 2 wherein the digital data signal from D-flop 40 of data stream receiver 11 is provided to D-flop 41 along with the 10 MHz system clock. The output from D-flop 41 is supplied to exclusive OR circuit 42 and to D-flop 43. The output terminals $Q_6$ and $Q_8$ of the shift register means are provided to the exclusive OR circuit 44 to provide a zero-crossing signal to AND circuit 45 upon the recognition of one of the patterns shown in FIG. 4. The 160 MHz shift rate signal is also supplied to the AND circuit 45 which then enables D-flop 43 to change only if a change in the received data mandates a change in the frequency of the synthesized sine wave being generated. The timing relationship between the received data, the system clock, the digital data signal and the frequency control signal is shown in FIG. 6. The digital data signal provides a negative-going edge if the bit cell contains a zero and a positive-going edge for the one. The edges are delayed one-half of a bit cell as determined by the timing of the positive-going edge of the 10 MHz clock provided to D-flop 40. The output of D-flop 41 is time aligned with the digital data signal since it also receives the 10 MHz clock signal. Its output is supplied along with the digital data signal to exclusive OR circuit 42 and to D-flop 43. The triggering signals to D-flop 43 are the leading edges of the 160 MHz shift signal when "anded" with the $Q_6$ or $Q_8$ output signals. This event occurs one-half bit cell later so that the frequency control signal is delayed a full bit cell from the received data.

Referring to FIG. 6, the frequency control signal is displaced one full bit cell from the received data and one-half bit cell from the digital data signal. Thus, the control signal determines the frequency of the synthesized sine wave transmitted in the next succeeding bit cell based on whether the digital data signal has a negative-going or positive-going zero crossing in the middle of a bit cell. If the data does not change for the succeeding bit cell, the frequency control signal must double in rate to provide the appropriate direction to the signal at the zero-crossing. This operation can be seen by the repetitive 1's and 0's for the data in FIG. 6.

The synthesized waveform appearing at the output terminal 24 is shown in FIG. 6 in time alignment with the frequency control signal. The repetition of the data in the next bit cell provides the middle of a bit cell transition in the frequency control signal in accordance with the pattern of the output states of the $Q_6$ and $Q_8$ terminals of the register. As a result, the frequency of the synthesized waveform is increased to indicate that the next succeeding bit of data is the same. The corresponding data bits are shown beneath the output signal waveforms in FIG. 6.

The encoding means used to generate the waveforms includes a series of multiplexers 31 each of which is connected through a gate to a load resistor to the summing or output terminal 24. The encoding means is shown in further detail in FIG. 5 as comprising twelve multiplexers 31, one for each signal level added between peaks of the low frequency 5 MHz waveform. Each multiplexer 31 is coupled to two of the output terminals of the shift registers 16, 17. The individual multiplexers 31 each comprise an AND circuit 32 and a NAND 33 circuit with their outputs connected to an OR 34 circuit. The frequency control signal applied to terminal 35 is either a 1 or 0 and determines for each individual multiplexer 31 which of the output terminals of the two shift registers connected thereto provides a signal to the resistor network 22.

Figure 5:
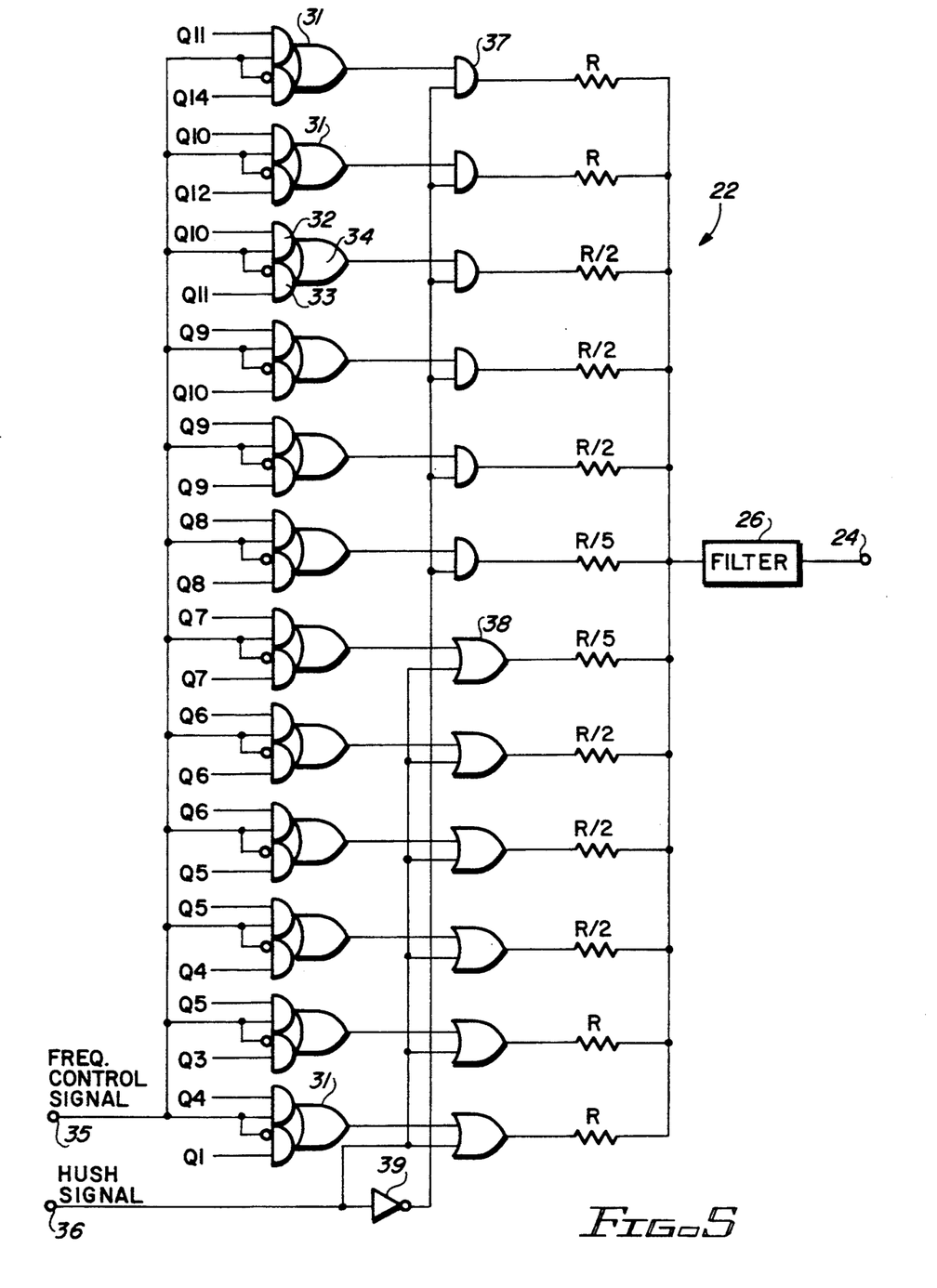
FIG. 5 is a block schematic diagram of the encoding means of the embodiment of FIG. 1.

The resistor network includes a number of resistors coupled between the multiplexers and the common summing terminal 24. The relative values of the resistors is shown in FIG. 5 with the weighting based on the individual segments of the encoding pattern. Different relative values may be utilized if desired. In the embodiment shown in FIG. 5, twelve resistors 22 are coupled between the output terminals 24 and the twelve multiplexers. Each resistor 22 receives the signal passed by the corresponding multiplexer from the shift register terminals. The value of the resistor determines its contribution to the signal at terminal. As shown, the weighting of the resistors varies from R to R/2 to R/5 thus establishing segments of three magnitudes in this embodiment.

The synthesized 5 MHz and 10 MHZ waveforms are shown in detail in FIG. 4 as being formed of 8 and 12 segments respectively. In the synthesis of the 5.0 MHz signal all multiplexers 31 are operative to supply current to all twelve resistors in the network. However, in the synthesis of the 10.0 MHz waveform, there are only 8 segments utilized in creating the waveform. The sequence with which the segments are provided at terminal 24 is determined by the arrangement of the connections of the output terminals of the stages of the shift registers to the AND and NAND circuits 32 and 33. The connections for the embodiment shown are set forth in FIG. 5. The rate of change of the signals supplied to the multiplexers is determined by the shift rate signal. It is to be noted that the preferred embodiment combines the output signals from the shift register terminals to create twelve possible segments occurring in a bit cell. The 5.0 MHz waveform is synthesized maintaining certain of the segments unchanged for more than the duration of one shift rate signal. For example, the crown portion of the 5.0 MHz waveform in FIG. 4 is shown to be formed of segments which remain unchanged for 3, 2 and 1 consecutive shift rate signals as noted. While the connections between multiplexers 31 and the shift registers 16, 17 provide the output waveforms shown in FIG. 4, the encoding patterns for each waveform can be changed by either changing the connections, varying the relative weighting of the resistors in network 22 or both.

The resistor network of the preferred embodiment also includes a series of gates, AND gates 37 and OR gates 38, which are coupled between the individual resistors of network 22 and the output of the multiplexers. The OR gates are coupled directly to the terminal 36 while AND gates 37 are coupled through an inverter 39.

The stepped or piecewise approximation of the waveform as seen in FIG. 4 is smoothed to more closely approximate a sine wave by the driver circuits of the "and" and "or" gates 37 and 38. The drivers do not effect instantaneous transitions between states with the transition being primarily determined by the slew rate of the gates and drivers. The slow transition between states provides an integration to smooth the waveform. The transition is on the order of the time between steps which is set by the shift rate. In addition, filtering is provided by the leakage inductance of subsequent circuitry, typically a coupling transformer connected to the output of the sine wave generator, and the load resistors. Leakage inductance in a coupling transformer has the same effect as placing an inductor in series with the output line. The leakage inductance in combination with the load resistors in network 22 form an L-R filter. The combined effect of the slew rate of the gate circuits and the L-R filter smooth the piecewise linear waveshape into a sinusoidal form. A capacitor can be added across the output if additional filtering is required. The L-R filter is shown as filter 26 in FIGS. 1 and 5.

The application of a hush signal to terminal 36 disables the system from generating a waveform and provides a baseline signal at terminal 24 through the OR circuits 38 while AND circuits 37 are rendered inoperative.

The above described embodiment of the invention provides a system using digital circuitry to generate sine wave signals in response to a received stream of digital data. The system employs different encoding patterns for synthesizing waveforms of different frequency. It is to be noted that modifications and variations can be made therein without departing from the scope of the invention as claimed.

We claim:

1. A system for synthesizing a sine wave signal wherein the frequency of the sine wave signal is varied in accordance with a stream of data received in bit cells at a data rate, said system employing different encoding patterns in generating sine wave signals of different frequencies, said system comprising:
    a) storage means for receiving and serially storing a digital data signal, said means having a plurality of stages;
    b) means for providing a shift rate signal to said storage means to advance the digital data signal at a rate greater than the data rate;
    c) control signal generating means coupled to selected stages of the storage means for recognition of a pattern of signals in the selected stages;
    d) means for providing the digital data signal to the control signal generating means, said generating means providing a frequency control signal in response to a change in data upon recognition of said pattern in the selected stages; and
    e) encoding means responsive to the frequency control signal and coupled to the storage means for generating a plurality of signal segments in response to the output signal of said generating means, said encoding means having an output summing terminal with the magnitude of the segments appearing at the summing terminal being determined by the states of stages in the storage means and the duration of the segments being determined by the shift rate signal, the signal appearing at the summing terminal being formed as a synthesized sine wave having a frequency determined by the output signal of the control signal generating means.

2. The invention in accordance with claim 1 wherein said encoding means includes a plurality of multiplexers, each multiplexer coupled to two stages of the storage means and provided with an output terminal, and further comprising means for providing the frequency control signal to each multiplexer of said encoding means.

3. The invention in accordance with claim 2 wherein said encoding means includes a resistor network coupled between the multiplexer output terminals and the summing terminal of the encoding means.

4. The invention in accordance with claim 3 wherein said resistor network includes resistors of different magnitude to provide an encoding pattern having segments of different magnitude.

5. The invention in accordance with claim 3 wherein said means for providing the digital data signal to the control signal generating means includes a delay circuit for delaying the received data by an interval equal to one-half of a bit cell.

6. The invention in accordance with claim 5 wherein said control signal generating means imparts a delay of one-half of a bit cell to the frequency control signal.

7. The invention in accordance with claim 6 wherein each multiplexer in the encoding means is coupled to a resistor in the network, the resistors being of differing magnitudes to thereby provide signal segments of differing magnitude.

8. The invention in accordance with claim 6 wherein said means for providing a shift rate signal provides a signal which is a multiple of the data rate.

9. The invention in accordance with claim 8 wherein the plurality of stages in said storage means is equal in number to said multiple of the data rate.

10. The invention in accordance with claim 9 wherein the number of stages in the storage means requires an interval equal to one bit cell at the data rate for the data signal to advance therethrough.

11. The invention in accordance with claim 10 wherein said encoding means further includes disabling means which provides one-half of the segments at the summing terminal when actuated to thereby establish a baseline signal level at said summing terminal.

* * * * *